United States Patent [19]

Vanderlaan et al.

[11] Patent Number: 5,514,732
[45] Date of Patent: May 7, 1996

[54] ANTI-BACTERIAL, INSOLUBLE, METAL-CHELATING POLYMERS

[75] Inventors: Douglas G. Vanderlaan; Susan B. Orr, both of Jacksonville, Fla.

[73] Assignee: Johnson & Johnson Vision Products, Inc., Fla.

[21] Appl. No.: 189,624

[22] Filed: Feb. 1, 1994

Related U.S. Application Data

[63] Continuation-in-part of Ser. No. 96,128, Jul. 22, 1993, abandoned.

[51] Int. Cl.$^6$ ............... B05D 5/06; C08F 20/54; C08F 12/28
[52] U.S. Cl. ............ 523/106; 523/108; 526/306; 526/310
[58] Field of Search .................. 523/106, 108; 526/310, 306

[56] References Cited

U.S. PATENT DOCUMENTS

| | | | |
|---|---|---|---|
| 4,361,689 | 11/1982 | Patel et al. | 523/108 |
| 4,450,262 | 5/1984 | Drake et al. | 523/106 |
| 4,889,664 | 12/1989 | Kindt-Larsen | 523/106 |

FOREIGN PATENT DOCUMENTS

| | | | |
|---|---|---|---|
| 0825548 | 5/1981 | U.S.S.R. | 523/108 |

*Primary Examiner*—Paul R. Michl
*Assistant Examiner*—LaVonda R. DeWitt

[57] ABSTRACT

A soft contact lens which comprises a water-swollen gel of a polymer prepared by polymerizing one or more hydrophilic monomers such as 2-hydroxyethyl methacrylate, one or more cross-linking monomers, and a monomer that contains metal-chelating functionality such as an aminopolycarboxylic acid that contains a polymerizable olefinic group.

26 Claims, 1 Drawing Sheet

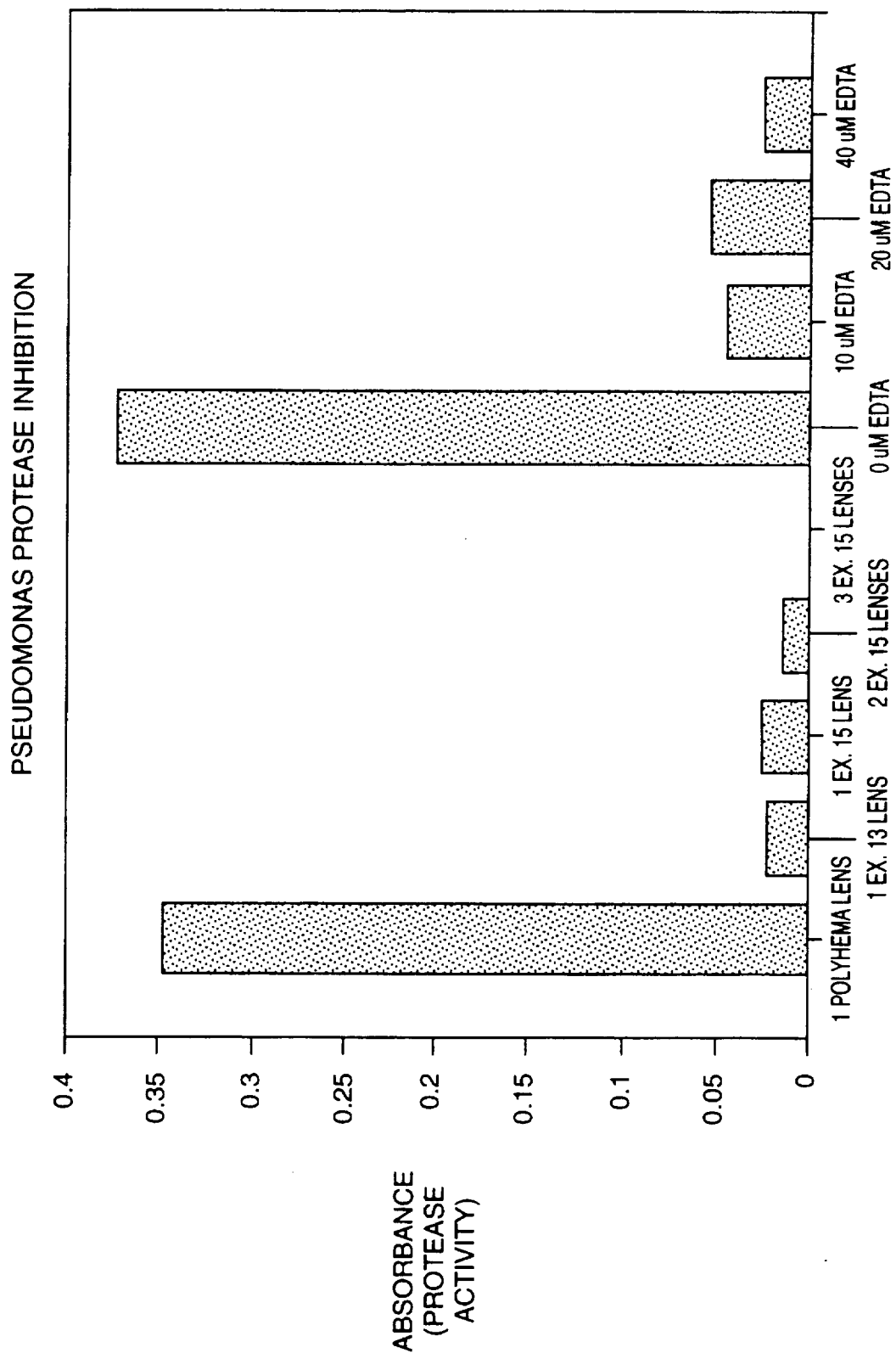

5,514,732

1

ANTI-BACTERIAL, INSOLUBLE, METAL-CHELATING POLYMERS

CROSS-REFERENCE TO RELATED APPLICATION

This application is a continuation-in-part of application Ser. No. 08/096,128, filed Jul. 22, 1993, now abandoned.

The invention relates to metal-chelating, hydrogel polymers that have anti-bacterial properties and which can be used in the fabrication of soft contact lenses. The invention also relates to a process for the preparation of soft contact lenses comprising said metal-chelating polymers and to a process for the preparation of the metal-chelating monomers that are employed in the production of said polymers.

BACKGROUND OF THE INVENTION

The most serious adverse response associated with the use of contact lenses is corneal ulceration. The risk of development of such ulcers is particularly associated with the use of soft lenses in an extended wear mode, that is, when the lens is worn continuously, without removal during sleep. Such ulcers can lead to perforation of the cornea, or can leave corneal scars which cause permanent partial vision loss. The most threatening ulcers are those caused by microbial agents such as Acanthamoeba or bacteria such as *Staphylococcus epidermidis, Staphylococcus aureus, Streptococcus pneumoniae* and Pseudomonas aeruginosa.

The healthy eye uses a number of mechanisms to defend itself from infection by pathogenic bacteria. Lysozyme, one of the principal proteins found in tears, is known to kill common Gram positive bacteria by hydrolyzing and dissolving parts of their exterior membranes. Other proteinaceous tear components such as complement proteins and immunoglobulins such as secretory IgA contribute to this defense system. Lactoferrin is a tear protein which is bacteriostatic by virtue of its ability to bind iron and thus make it unavailable to bacteria. Bacteria cannot maintain sustained growth in the absence of iron. Also, other trace metallic elements such as calcium, copper, magnesium, molybdenum, and zinc are essential co-factors for many bacterial enzymes such as proteinases. In many cases, it is the action of such enzymes on tissue of the eye that causes much of the damage during a bacterial infection of the eye.

This invention is based upon the discovery that soft contact lenses can be prepared from polymers that contain metal chelating functionality, and that such lenses have the ability to chelate metals such as iron, calcium, copper, magnesium, molybdenum, and zinc, and thus make such metals unavailable to bacteria.

BRIEF SUMMARY OF THE INVENTION

A soft contact lens which comprises a water-swollen gel of a polymer prepared by polymerizing one or more hydrophilic monomers such as 2-hydroxyethyl methacrylate, one or more cross-linking monomers, and a monomer that contains metal-chelating functionality.

The Prior Art

Hedlund et al., U.S. Pat. No. 4,863,964;

DeVoe et al., U.S. Pat. No. 4,530,963; and

Mahoney et al., "Acute Iron Poisoning—Rescue with Macromolecular Chelators", *J. Clin. Invest.*, 84, 1362–1366 (1989).

2

DETAILED DESCRIPTION OF THE INVENTION

The reactive monomer mixture used in the invention contains a hydrophilic monomer such as 2-hydroxyethyl methacrylate ("HEMA") as the major component, one or more cross-linking monomers, optionally small amounts of other monomers such as methacrylic acid, and one or more monomers that contain metal-chelating functionality. HEMA is one preferred hydrophilic monomer. Other hydrophilic monomers that can be employed include 2-hydroxyethyl acrylate, 2-hydroxypropyl methacrylate, 2-hydroxypropyl acrylate, 3-hydroxypropyl methacrylate, N-vinyl pyrrolidone, glycerol mono-methacrylate, glycerol monoacrylate, N,N-dimethylmethacrylamide, and the like.

Additional hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinyl benzoyl chloride, or the like, to produce a polyethylene polyol having one or more terminal polymerizable olefinic groups such as methacrylate groups or styryl groups bonded to the polyethylene polyol through linking moieties such as carbamate or ester groups.

The cross-linking monomers that can be employed, either singly or in combination, include ethylene glycol dimethacrylate ("EGDMA"), trimethylolpropane trimethacrylate ("TMPTMA"), glycerol trimethacrylate, polyethylene glycol dimethacrylate (wherein the polyethylene glycol has a molecular weight up to, e.g., about 5000), and other polyacrylate and polymethacrylate esters, such as the end-capped polyoxyethylene polyols described above containing two or more terminal methacrylate moieties. The cross-linking monomer can also be the monomer that contains chelating functionality, as is explained below. The cross-linking monomer is used in the usual amounts, e.g., from about 0.000415 to about 0.0156 mole per 100 grams of reactive monomer mixture.

Other monomers that can be used include methacrylic acid, which is used to influence the amount of water that the hydrogel will absorb at equilibrium. Methacrylic acid is usually employed in amounts of from about 0.2 to about 8 parts, by weight, per 100 parts of hydrophilic monomer. Other monomers that can be present in the polymerization mixture include methoxyethyl methacrylate, acrylic acid, ultra-violet absorbing monomers, and the like.

A polymerization catalyst is included in the monomer mixture. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic α-hydroxy ketone or a tertiary amine plus a diketone. Illustrative examples of photoinitiator systems are 2-hydroxy-2-methyl-1-phenyl-propan-1-one and a combination of camphorquinone and ethyl 4-(N,N-dimethylamino)benzoate. The catalyst is used in the polymerization reaction mixture in catalytically effective amounts, e.g., from about 0.1 to about 2 parts by weight per 100 parts of hydrophilic monomer such as HEMA.

The major novelty in the invention resides in the use of a monomer that contains chelating functionality. Typical chelating compounds include aminopolycarboxylic acids such as ethylenediamine tetraacetic acid ("EDTA"), diethylenetriamine pentaacetic acid ("DTPA"), diethylenetriamine tetraacetic acid, ethylene glycol bis(2-aminoethyl ether)-N,N,N',N'-tetraacetic acid, and the like. Such compounds can be reacted with a compound containing olefinic unsaturation to form a polymerizable monomer that contains metal-chelating functionality and which can be polymerized in the reactive monomer mixture used to prepare the hydrogel polymer of the invention. (Meth)acrylatohydroxamic acid can also be used as a monomer that contains chelating functionality.

In one aspect of the invention, the monomer that contains metal-chelating functionality is an ester of (a) an aminopolycarboxylic acid such as ethylenediamine tetraacetic acid, diethylenetriamine pentaacetic acid, diethylenetriamine tetraacetic acid or ethylene glycol bis(2-aminoethyl ether)-N, N,N' N'-tetraacetic acid and (b) a hydroxyalkyl ester of (meth)acrylic acid, that is, acrylic or methacrylic acid, wherein the alkyl group has from 2 up to about 18 carbon atoms, and preferably from 2 to 6 carbon atoms. To illustrate the preparation of such a monomer that contains chelating functionality, EDTA or DTPA, in the form of its dianhydride, is reacted with HEMA to form a monomer that comprises the HEMA moiety joined through an ester linkage to the EDTA or DTPA moiety. The following example illustrates the preparation of such a monomer:

EXAMPLE 1

1.50 grams DTPA anhydride is combined with 0.67 gram HEMA (mole ratio of HEMA:DTPA anhydride is about 5:4), 29.17 grams triethylamine ("TEA"), 8.33 grams acetonitrile and 12.50 grams DMSO (dimethylsulfoxide). The resulting clear, two-phase mixture is stirred at room temperature for one hour. The lower layer is evaporated at 50° C. and reduced pressure to give a yellow oil. The composition produced includes the 1:1 adduct, which has the following formula in the non-ionized form:

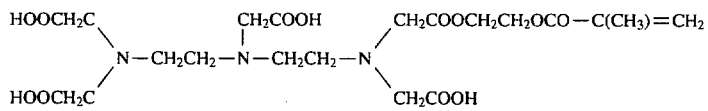

Some di-adduct is also expected to be produced, which can serve as the cross-linking monomer.

In another aspect of the invention, the monomer that contains metal-chelating functionality is an amide of (a) an aminopolycarboxylic acid such as ethylenediamine tetraacetic acid, diethylenetriamine pentaacetic acid, diethylenetriamine tetraacetic acid, or ethylene glycol bis(2-aminoethyl ether)-N,N,N',N'-tetraacetic acid and (b) an aminoalkyl acrylamide or methacrylamide wherein the alkyl group has from 2 up to about 18 carbon atoms, and preferably from 2 to 6 carbon atoms. Since amides are usually more hydrolytically stable than esters, this aspect of the invention is preferred. The following example is illustrative:

EXAMPLE 2

1.50 grams DTPA anhydride is combined with 0.67 gram aminopropyl methacrylamide hydrochloride ("APMA") [mole ratio of DPTA anhydride: APMA is about 4.2:3.7], 29.17 grams TEA, 8.33 grams acetonitrile and 12.50 grams DMSO. The resulting two-phase mixture is stirred at room temperature for one hour. The lower layer is evaporated at 50° C. and reduced pressure to give a viscous yellow oil. 5.0 ml water was added and the blend was evaporated again. 100 ml isopropyl alcohol is added and the resulting white solid was filtered and dried, yielding 1.63 grams of product which included the 1:1 adduct having the following formula in the non-ionized form:

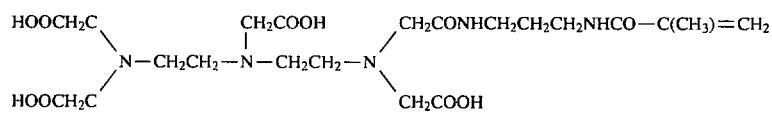

Some di-adduct is also expected to be produced, which can serve as the cross-linking monomer.

In addition to HEMA and aminopropyl methacrylamide, other polymerizable compounds that can be reacted with a chelating agent such as ethylenediamine tetraacetic acid, diethylenetriamine pentaacetic acid, diethylenetriamine tetraacetic acid, ethylene glycol bis(2-aminoethyl ether)-N,N, N',N'-tetraacetic acid, or other aminopolycarboxylic acid, to form a polymerizable monomer that includes chelating functionality, include vinylbenzyl amine, allyl amine, hydroxyethyl acrylate, hydroxypropyl methacrylate, and the like.

Preferably, the hydrogel polymers of the invention are directly cast or molded in the shape of a contact lens by a process which comprises the steps of:

(1) molding or casting a polymerization mixture comprising:

(a) a monomer mixture comprising a major proportion of one or more hydrophilic monomers such as 2-hydroxyethyl methacrylate, one or more cross-linking monomers, and a monomer that contains metal-chelating functionality; and (b) an inert, displaceable diluent, under conditions to polymerize said monomer mixture to produce a shaped gel of a copolymer of said monomers and said diluent; and (2) thereafter replacing said diluent with water.

The diluents employed are ultimately water-displaceable. That is, the shaped gel of a copolymer of said monomers and said diluent is treated with a solvent to remove the diluent and ultimately replace it with water. In most cases, the solvent used to remove the inert diluent will be water (or an aqueous solution such as physiological saline). However, if desired, and depending on the solubility characteristics of the inert diluent used in the process of the invention, the solvent initially used to replace the inert diluent can be an organic liquid such as ethanol, methanol, acetone, glycerol, mixtures thereof, or the like, or a mixture of one or more such organic liquids with water, followed by extraction with pure water (or physiological saline) to produce a shaped gel comprising a copolymer of said monomers swollen with water.

Glycerol and boric acid esters of glycerol are the preferred inert, displaceable diluents for use in the invention.

The use of the monomers described in Examples 1 and 2 in the preparation of soft contact lenses is described in the following two examples:

EXAMPLE 3

0.40 gram of the oil from Example 1 is combined with 2.0 grams HEMA (2-hydroxyethyl methacrylate) [the HEMA also contains about 0.15 weight percent ethylene glycol dimethacrylate], 1.0 gram glycerin, 0.50 gram water and 0.03 gram DAROCUR 1173 ($\alpha$-hydroxy-$\alpha,\alpha$-dimethylacetophenone). This blend is filtered and cured in polystyrene contact lens molds by irradiation with UV light for 0.5 hour. The molds are opened and placed into borate buffered saline solution to release and hydrate the lenses.

EXAMPLE 4

0.5 gram of the product of EXAMPLE 2 are combined with 2.08 grams of HEMA [the HEMA also contains about 0.15 weight percent ethylene glycol dimethacrylate], 1.04 grams glycerin, 0.5 gram water and 0.03 gram DAROCUR 1173. The resulting blend is filtered and used to make lenses following the procedure of Example 3.

The lenses prepared in Examples 3 and 4 were tested for their ability to chelate iron, by the following procedure:

METHOD FOR IRON ANALYSIS

Following the method of Skoog and West as described in "Fundamentals of Analytical Chemistry", (Third Edition) page 761 the following solutions were made:

Hydroxylamine—10 grams of $H_2NOH \cdot HCL$ in 100 ml water with sufficient sodium citrate added to bring the pH to 4.5.
Sodium citrate—250 g diluted with water to one liter.
o-Phenanthroline—0.3% in water.
81 ppm $Fe^{+2}$—0.400 gram of $FeSO_4 \cdot 7H_2O$ and 1 ml $H_2SO_4$ diluted with water to one liter.

Lenses are blotted to remove excess surface water and placed into vials with 100 µl of 81 ppm $Fe^{+2}$ solution and 900 µl water. These vials are shaken for 0.5 hour. 500 µl of the resulting sample solution is combined with 3.6 µl sodium citrate solution, 33.3 µl hydroxyethylamine solution and 100 µl of the o-phenanthroline solution. After five minutes this solution is diluted to 5.0 ml with water.

PolyHEMA control contact lenses[1] are similarly exposed to iron, and solutions are also made with no lenses as controls.

[1] A contact lens made from a polymer produced from a reactive monomer mixture containing 96.8% by weight of HEMA, 1.97% methacrylic acid, 0.78% ethylene glycol dimethacrylate (EGDMA), 0.1% of trimethylolpropane trimethacrylate (TMPTMA) and 0.34% of DAROCUR 1173.

The absorbencies of each solution are measured at 508 nm using a solution prepared with no iron as a reference and using 1 cm path-length cells.

| ABSORBANCE AT 508 nm | | |
|---|---|---|
| No-Lens Control | Control Lens | EXAMPLE 3 Lens |
| 0.236 | 0.187 | 0.008 |

Thus, the Example 3 lens removed 97% of the iron from the solution.

Iron chelation testing of the lens of Example 4 following the procedure employed to test the lens of Example 3 gives the following results:

| ABSORBANCE AT 508 nm | | |
|---|---|---|
| No-Lens Control | Control Lens | EXAMPLE 5 Lens |
| 0.216 | 0.200 | 0.033 |

Thus, the Example 4 lens removes 85% of the iron from the solution.

EXAMPLE 5

0.2 gram of the oil from Example 1 is combined with 9.0 grams isopropyl alcohol. The blend is filtered and the resulting white solid is dried to give 0.12 gram product. This product is used to make lenses following the procedure and using the reactive monomer mixture described in Example 3. The water content of these lenses (measured by refractive index following the method of Brennen, *International Contact Lens Clinic*, pp. 357–362, 1983) is 66.6% where:

$$\text{Water Content} = \frac{\text{mass of wet lens} - \text{mass of dry lens}}{\text{mass of wet lens}}$$

Iron chelation testing following the procedure described above gives the following results:

| ABSORBANCE AT 508 nm | |
|---|---|
| No-Lens Control | Example 5 Lens |
| 0.227 | 0.003 |

Thus, the Example 5 lens removes 99% of the iron from the solution.

EXAMPLE 6

Lenses from Example 3 are combined with 100 µl of 66 ppm $Fe^{+3}$ (0.16 grams $FeCl_3 \cdot 6H_2O$ and 1.0 gram $H_2SO_4$ in 500 ml water) and 900 µl water. After 30 minutes the resulting solution is analyzed for iron using the procedure described above giving the following iron uptake results:

| ABSORBANCE AT 508 nm | | |
|---|---|---|
| No-Lens Control | Control Lens | Example 6 Lens |
| 0.155 | 0.131 | 0.006 |

Thus, the Example 6 lens removes 96% of the iron from the solution.

EXAMPLE 7

Two lenses from Example 4 are boiled for three hours in borate buffered saline solution, removing them at various intervals to measure their diameters (TABLE 1).

TABLE 1

| Time (hours) | Lens Diameter (mm) |
|---|---|
| 0.0 | 14.98, 14.90 |
| 0.5 | 14.94, 14.87 |
| 1.0 | 14.84, 14.79 |
| 2.0 | 14.80, 14.80 |
| 3.0 | 14.80, 14.80 |

Iron chelation testing of these boiled lenses gives the following results:

| ABSORBANCE AT 508 nm | |
|---|---|
| No-Lens Control | Example 4 Lens (boiled three hours) |
| 0.223 | 0.035 |

Thus, these lenses retain their iron chelating ability even after extended boiling.

EXAMPLE 8

Lenses were made from a reactive monomer mixture containing 0.59 gram of a DPTA anhydride/APMA adduct prepared by the method of Example 2, 1.25 grams of

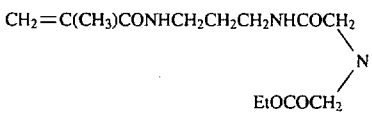
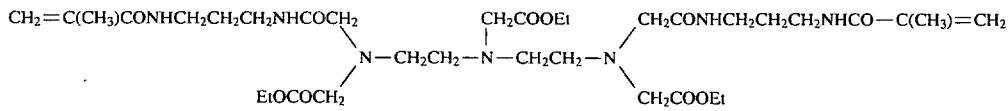

HEMA, 0.03 gram of DAROCUR 1173, and 0.61 gram of glycerol, by the method described in Example 3.

The water content of the resulting lens was 52.1±0.4.

EXAMPLE 9

Lenses were made from a reactive monomer mixture containing 0.59 gram of a DPTA anhydride/APMA adduct prepared by the method of Example 2, 1.23 grams of HEMA, 0.02 gram methacrylic acid, 0.03 gram of DAROCUR 1173, and 0.61 gram of glycerol, by the method described in Example 3.

The water content of the resulting lens was 57.8±0.6.

The monomer that contains metal-chelating functionality is employed in an amount such that the soft contact lens made from the reactive monomer mix containing said monomer that contains metal-chelating functionality is effective to substantially reduce the essential trace metals present in the immediate surroundings in which the lens is present, either in storage or in place in the eye. Typical proportions have been illustrated in the Examples, above. As a general rule, the monomer that contains metal-chelating functionality is employed in a proportion of from about 0.01 to about 10 mmoles per 100 grams of reactive monomer mix.

EXAMPLE 10

0.10 Gram of APMA was added to a solution of 0.20 gram of DTPA anhydride and 0.20 gram of triethylamine in 27 grams of anhydrous ethanol. The solution cleared as it was heated to 75° C. After 30 minutes it was cooled to room temperature and several milliliters of 1.0M etherous HCl was added; pH paper was used to confirm that the solution was acidic. This solution was then heated to reflux for 8 hours. The solvent was removed at reduced pressure. 20 ml of saturated NaHCO$_3$ was added to the residue, and the product was extracted into CH$_2$Cl$_2$. TLC (silica gel plates, eluting with CH$_2$Cl$_2$ with a trace of NH$_4$OH) showed a major product in addition to DTPA pentaethylester. The product was isolated as an oil by evaporation of the solvent.

A small sample of this product was isolated from the product mixture by flash chromatography. $^1$H NMR (CDCl$_3$) 1.23 ppm (t, 9H, 7 Hz), 1.68 ppm (m, 4H), 1.96 ppm (s, 6H), 2.7–3.4 ppm (m, 26H), 4.12 ppm (q, 2H, 7 Hz), 4.14 ppm (q, 4H, 7 Hz), 5.29 ppm (m, 2H), 5.77 ppm (s, 2H), 7.03 ppm (br t, 2H), 7.97 ppm (br t). Its $^1$H NMR was consistent with the structure shown below, in which Et=ethyl:

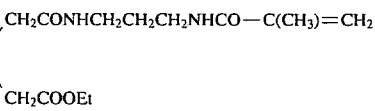

EXAMPLE 11

3.50 Gram of APMA was added to 5.00 grams of ethylenediamine-tetraacetic dianhydride and 8.08 grams of triethylamine in 200 ml anhydrous ethanol. The mixture was heated at reflux for 2 hours. 1M etherous HCl was then added until the solution was acidic by pH paper. The solution was refluxed for 6 hours. 200 ml saturated NaHCO$_3$, 100 ml H$_2$O and 200 ml of EtOAc (ethyl acetate) was added to the cooled solution. The EtOAc layer was washed two times with saturated NaCl and dried over Na$_2$SO$_4$. As the solvent was removed crystals formed. They were washed with fresh EtOAc and dried to yield 3.1 grams of white crystals, m.p.=124°–126° C. after recrystallization with EtOAc; $^1$H NMR (CDCl$_3$) 1.27 ppm (t, 6H, 7 Hz), 1.70 ppm (m, 4H), 1.98 ppm (s, 6H), 2.7–3.5 (m, 20 H), 4.17 ppm (q, 4H, 7 Hz), 5.32 (m, 2H), 5.77 ppm (s, 2H), 6.88 ppm (br s, 2H), 7.88 (br s, 2H); IR (neat) 3310, 2920, 1735, 1656, 1619, 1532, 1202, 1138, 1028, 929 cm$^{-1}$. This data is consistent with the structure shown below in which Et=ethyl:

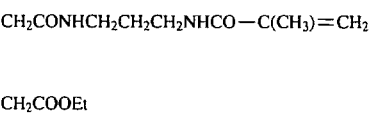

Examples 10 and 11 illustrate an important aspect of the invention in which the recovery of the reaction product of ethylenediamine tetraacetic acid or diethylenetriamine pentaacetic acid anhydrides with an aminoalkyl(meth)acrylamide is facilitated by carrying out the reaction in a lower alkanol (e.g., a C$_{1-6}$alkanol) to convert the free carboxylic acid groups to the corresponding $C_{1-6}$alkyl esters. The thus esterified products can then be recovered in purer form, in some cases as crystals, as is illustrated in Example 11.

In accordance with this aspect of the invention, there is provided a process which comprises the steps of:

(a) reacting ethylenediamine tetraacetic acid anhydride or diethylenetriamine pentaacetic acid anhydride with an aminoalkyl(meth)acrylamide in a $C_{1-6}$alkanol reaction medium for a period of time and at a temperature sufficient to produce an addition product comprising an amide of ethylenediamine tetraacetic acid or diethylenetriamine pentaacetic acid [a mono- or a di-amide is usually formed—the examples herein illustrate the preparation of the diamide] and said aminoalkyl(meth)acrylamide, and wherein the free carboxyl groups of said addition product are converted to $C_{1-6}$alkyl ester groups; and (b) recovering said addition product.

When these ester forms of the chelating monomers are incorporated into hydrogel lenses as taught herein, they are not active as chelators until the esters are hydrolyzed to re-form the free carboxyl groups. This hydrolysis is easily accomplished by heating the lens in water, as is shown in Examples 13 and 14, below. In the experiments reported in Examples 13 and 14, the lenses were heated in water at 120° for 7 hours. However, conventional hydrolysis conditions can be used, as will be obvious to the person skilled in the art. The amide groups formed by reaction of the aminoalkyl(meth)acrylamide with the anhydride moieties are more stable to hydrolysis than the ester groups, and do not hydrolyze under the conditions normally employed to regenerate the free carboxyl from the ester groups.

EXAMPLE 12

3.0 Grams of N-hydroxyethylethylenediamine triacetic acid was combined with 43 grams methanol and about 12 grams 1M HCl in ether and heated to reflux for six hours. The solvent was then evaporated and about 50 ml NaHCO$_3$ was added and the product was extracted into CH$_2$Cl$_2$. After evaporation of the solvent the product was recovered as 2.0 grams of colorless oil with a strong absorption at 1735 cm$^{-1}$.

This oil was combined with 0.71 grams methacryloyl chloride and 0.54 grams pyridine in 40 ml CH$_2$Cl$_2$. After stirring at room temperature for 24 hours this solution was extracted two times with saturated aqueous NaHCO$_3$ and dried over Na$_2$SO$_4$ to yield a straw colored oil after evaporation of solvent.

EXAMPLE 13

0.84 Gram of the oil from Example 10 was combined with 1.26 grams HEMA, 0.92 gram boric acid ester of glycerin (0.16 mole boron per mole glycerin) and 0.02 gram DAROCUR 1173. This blend was filtered and cured in polystyrene contact lens molds by irradiation with UV light for 0.5 hour. The molds were opened and placed into borate buffered saline solution to release and hydrate the lenses. The lenses were then heated in buffered saline in an autoclave at 120° C. for 7 hours. The diameter of the lenses before autoclaving was 11.9 mm. After autoclaving the diameter of the lenses was 15.2 mm.

Iron chelation testing following the procedure described above, except that the lens was combined with 300 µl Fe$^{+2}$ solution and 700 µl water, then shaken for 48 hours, after which the iron content of the resulting lens solution was analyzed:

| ABSORBANCE AT 508 nm | |
|---|---|
| No-Lens Control | Example 13 Lens |
| 0.735 | 0.034 |

Thus the Example 13 lens removed 95% of the iron from the solution.

EXAMPLE 14

Lenses were made from a blend of 0.04 gram of the crystalline product from Example 11 combined with 1.36 grams HEMA, 0.62 gram boric acid ester of glycerin (0.16 mole boron per mole glycerin) and 0.01 gram DAROCUR 1173. The lenses were then heated in buffered saline in an autoclave at 120° C. for 7 hours. The diameter of the lenses before autoclaving was 13.4 mm. After autoclaving the diameter of the lenses was 13.9 mm.

Iron chelation testing following the procedure described above, except that the lens was combined with 100 µl Fe$^{+2}$ solution and 900 µl water, then shaken for 24 hours, after which the iron content of the resulting lens solution was analyzed:

| ABSORBANCE AT 508 nm | |
|---|---|
| No-Lens Control | Example 13 Lens |
| 0.243 | 0.062 |

Thus the Example 14 lens removed 74% of the iron from the solution.

EXAMPLE 15

Lenses were made from a blend of 0.14 gram of the crystalline product from Example 11 combined with 1.26 grams HEMA, 0.62 gram boric acid ester of glycerin (0.16 mole boron per mole glycerin) and 0.01 gram DAROCUR 1173. The lenses were then heated in buffered saline in an autoclave at 120° C. for 7 hours. The diameter of the lenses before autoclaving was 13.2 mm. After autoclaving the diameter of the lenses was 14.8 mm.

Iron chelation testing following the procedure described above, except that the lens was combined with 100 µl Fe$^{+2}$ solution and 900 µl water, then shaken for 24 hours, after which the iron content of the resulting lens solution was analyzed:

| ABSORBANCE AT 508 nm | |
|---|---|
| No-Lens Control | Example 13 Lens |
| 0.243 | 0.008 |

Thus the Example 15 lens removed 97% of the iron from the solution.

EXAMPLE 16

0.84 Gram of the oil from Example 12 was combined with 1.24 grams HEMA, 0.91 gram glycerin, 0.03 gram EGDMA (ethylene glycol dimethacrylate) and 0.02 gram DAROCUR 1173. This blend was filtered and cured in polystyrene contact lens molds by irradiation with UV light for 0.5 hour.

The molds were opened and placed into borate buffered saline solution to release and hydrate the lenses. The lenses were then heated in buffered saline in an autoclave at 120° C. for 7 hours. The diameter of the lenses before autoclaving was 12.2 mm. After autoclaving the diameter of the lenses was 14.6 mm.

EXAMPLE 17

1.0 Gram of the crystalline product of Example 11 was combined with 12 grams of ethanol and 12 grams of water. 2.0% Aqueous NaOH was added until the pH of the solution reached 11. After 30 minutes 37% HCl was added dropwise to adjust the pH to 7. The solvent was evaporated and 10 grams methanol was added. The mixture was filtered and the resulting methanol solution was evaporated to give a white crystalline product.

EXAMPLE 18

Lenses were made by the procedure described above from 0.13 gram of the product from Example 17 combined with 1.27 grams HEMA, 0.64 gram boric acid ester of glycerin and 0.02 gram DAROCUR 1173.

Iron chelation testing following the procedure described above, except that the lens was combined with 300 µl $Fe^{+2}$ solution and 700 µl water, then shaken for 48 hours, after which the iron content of the resulting lens solution was analyzed:

| ABSORBANCE AT 508 nm | |
|---|---|
| No-Lens Control | Example 13 Lens |
| 0.752 | 0.105 |

Thus the Example 18 lens removed 86% of the iron from the solution.

EXAMPLE 19

A protease-producing strain of *Pseudomonas aeruginosa* was cultured in 10 ml of Meuller-Hinton broth with no supplementation and grown overnight at 37° C. at 230 rpm. The bacteria were removed from the culture by centrifugation. To 1.0 ml portions of this sterile broth (diluted 1/10) either (1) from one to three sterile contact lenses made with or without a metal chelating monomer (the lenses used were the polyHEMA control lens described above in Example 4 and the lenses described above in Examples 13 and 15), or (2) from 10 to 40 µM EDTA disodium salt, were added to the 1.0 ml portions and incubated with agitation at room temperature for 24 hours. The proteolytic activity was then measured using an azocasein assay as described in E. Kessler, H. E. Kennah, and S. I. Brown ("Pseudomonas protease. Purification, partial characterization and its effect on collagen, proteoglycan, and rabbit corneas." Invest. Ophthalmology Visual Science 1977; 16:488–97). The results, displayed in the graph shown as FIG. 1, show that contact lenses made with these chelating monomers, like soluble EDTA, strongly inhibited *Pseudomonas aeruginosa* proteases. Notably, when 3 Example 15 lenses were used, no proteolytic activity at all was found.

EXAMPLE 20

4.74 Grams methacryloyl chloride was added in small increments to a stirring mixture of 3.50 grams hydroxylamine hydrochloride, 16.0 grams sodium carbonate and 40 ml ethanol cooled in an ice-water bath. The mixture was stirred for 48 hours, then rotovapped to give a white solid. This solid was extracted with isopropyl alcohol, which was then evaporated to give 5.42 grams of a semi-solid product. When this semi-solid was combined with ethyl acetate, white crystalline methacrylatohydroxamic acid separated, which was recovered by filtration and was rinsed with additional ethyl acetate. Methacrylatohydroxamic acid has the formula:

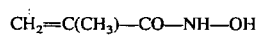

Contact lenses were made by the procedure described above from a blend of 0.75 gram of the boric acid ester of glycerin (0.16 mole boron per mole glycerin), 0.66 gram HEMA, 0.01 gram methacrylic acid, 0.01 gram ethylene glycol dimethacrylate, and 0.15 gram of methacrylatohydroxamic acid.

100 µl $Fe^{+2}$ solution and 900 µl water were combined with a lens of this Example 20 and shaken for 21 hours. Iron analysis of the resulting solution showed that 90% of the iron had been removed from the water.

Methacrylatohydroxamic acid is relatively hydrolytically unstable; therefore, lenses containing this monomer should not be heated in water for extended periods of time.

What is claimed is:

1. A soft contact lens which comprises a water-swollen gel of a polymer prepared by polymerizing one or more hydrophilic monomers, one or more cross-linking monomers, and a monomer that contains metal-chelating functionality, wherein the monomer that contains metal-chelating functionality is an ester of (a) ethylenediamine tetraacetic acid, diethylenetriamine pentaacetic acid, diethylenetriamine tetraacetic acid, or ethylene glycol his (2-aminoethyl ether)-N,N,N',N'-tetraacetic acid and (b) a hydroxyalkyl ester of acrylic or methacrylic acid.

2. The soft contact lens of claim 1 wherein the hydrophilic monomer is 2-hydroxyethyl methacrylate.

3. A soft contact lens which comprises a water-swollen gel of a polymer prepared by polymerizing one or more hydrophilic monomers, one or more cross-linking monomers, and a monomer that contains metal-chelating functionality, wherein the monomer that contains metal-chelating functionality is an amide of (a) ethylenediamine tetraacetic acid, diethylenetriamine pentaacetic acid, diethylenetriamine tetraacetic acid, or ethylene glycol bis(a-aminoethyl ether)-N, N,N',N'-tetraacetic acid and (b) an aminoalkyl acrylamide or methacrylamide.

4. The soft contact lens of claim 3 wherein the hydrophilic monomer is 2-hydroxyethyl methacrylate.

5. The soft contact lens of claim 1 wherein the hydroxyalkyl ester of acrylic or methacrylic acid is 2-hydroxyethyl methacrylate.

6. The soft contact lens of claim 2 wherein the hydroxyalkyl ester of acrylic or methacrylic acid is 2-hydroxyethyl methacrylate.

7. The soft contact lens of claim 4 wherein the aminoalkyl acrylamide or methacrylamide is aminopropyl methacrylamide.

8. The soft contact lens of claim 1 wherein the aminoalkyl acrylamide or methacrylamide is aminopropyl methacrylamide.

9. The soft contact lens of claim 3 wherein the monomer that contains metal-chelating functionality is an ester of (a) ethylenediamine tetraacetic acid or diethylenetriamine pentaacetic acid and (b) a hydroxyalkyl ester of acrylic or methacrylic acid.

10. The soft contact lens of claim 3 wherein the monomer that contains metal-chelating functionality is an amide of (a) ethylenediamine tetraacetic acid or diethylenetriamine pentaacetic acid and (b) an aminoalkyl acrylamide or methacrylamide.

11. The soft contact lens of claim 3 wherein the monomer that contains metal-chelating functionality is an ester of (a) diethylenetriamine pentaacetic acid and (b) a hydroxyalkyl ester of acrylic or methacrylic acid.

12. The soft contact lens of claim 3 wherein the monomer that contains metal-chelating functionality is an amide of (a) di-ethylenetriamine pentaacetic acid and (b) an aminoalkyl acrylamide or methacrylamide.

13. A soft contact lens which comprises a water-swollen gel of a polymer prepared by polymerizing one or more hydrophilic monomers, one or more cross-linking monomers, and a monomer that contains metal-chelating functionality, wherein the monomer that contains metal chelating functionality is (meth)acrylatohydroxamic acid.

14. Process which comprises the steps of:

(a) reacting ethylenediamine tetraacetic acid anhydride or diethylenetriamine pentaacetic acid anhydride with an aminoalkyl(meth)acrylamide in a $C_{1-6}$alkanol reaction medium for a period of time and at a temperature sufficient to produce an addition product comprising an amide of ethylenediamine tetraacetic acid or diethylenetriamine pentaacetic acid and said aminoalkyl-(meth) acrylamide, and wherein the free carboxyl groups of said addition product are converted to $C_{1-6}$alkyl ester groups; and (b) recovering said addition product.

15. A sort contact lens Which comprises a water-swollen gel of a polymer prepared by polymerizing one or more hydrophilic monomers, one or more cross-linking monomers, and a monomer that contains iron-chelating functionality wherein the monomer that contains iron-chelating functionality is an ester of (a) ethylenediamine tetraacetic acid, diethylenetriamine pentaacetic acid, diethylenetriamine tetraacetic acid, or ethylene glycol bis(2-aminoethyl ether)-N,N,N',N'-tetraacetic acid and (b) a hydroxyalkyl ester of acrylic or methacrylic acid.

16. The soft contact lens of claim 15 wherein the hydrophilic monomer is 2-hydroxyethyl methacrylate.

17. A soft contact lens which comprises a water-swollen gel of a polymer prepared by polymerizing one or more hydrophilic monomers, one or more cross-linking monomers, and a monomer that contains iron-chelating functionality wherein the monomer that contains iron-chelating functionality is an amide of (a) ethylenediamine tetraacetic acid, diethylenetriamine pentaacetic acid, diethylenetriamine tetraacetic acid, or ethylene glycol his (2-aminoethyl ether)-N,N,N',N'-tetraacetic acid and (b) an aminoalkyl acrylamide or methacrylamide.

18. The soft contact lens of claim 17 wherein the hydrophilic monomer is 2-hydroxyethyl methacrylate.

19. The soft contact lens of claim 15 wherein the hydroxyalkyl ester of acrylic or methacrylic acid is 2-hydroxyethyl methacrylate.

20. The soft contact lens of claim 16 wherein the hydroxyalkyl ester of acrylic or methacrylic acid is 2-hydroxyethyl methacrylate.

21. The soft contact lens of claim 17 wherein the aminoalkyl acrylamide or methacrylamide is aminopropyl methacrylamide.

22. The soft contact lens of claim 18 wherein the aminoalkyl acrylamide or methacrylamide is aminopropyl methacrylamide.

23. The soft contact lens of claim 15 wherein the monomer that contains iron-chelating functionality is an ester of (a) ethylenediamine tetraacetic acid or diethylenetriamine pentaacetic acid and (b) a hydroxyalkyl ester of acrylic or methacrylic acid.

24. The soft contact lens of claim 17 wherein the monomer that contains iron-chelating functionality is an amide of (a) ethylenediamine tetraacetic acid or diethylenetriamine pentaacetic acid and (b) an aminoalkyl acrylamide or methacrylamide.

25. The soft contact lens of claim 17 wherein the monomer that contains iron-chelating functionality is an ester of (a) diethylenetriamine pentaacetic acid and (b) a hydroxyalkyl ester of acrylic or methacrylic acid.

26. The soft contact lens of claim 19 wherein the monomer that contains iron-chelating functionality is an amide of (a) diethylenetriamine pentaacetic acid and (b) an aminoalkyl acrylamide or methacrylamide.

\* \* \* \* \*

UNITED STATES PATENT AND TRADEMARK OFFICE
CERTIFICATE OF CORRECTION

PATENT NO. : 5,514,732
DATED : May 7, 1996
INVENTOR(S) : Douglas G. Vanderlaan; Susan B. Orr It is certified that error appears in the above-identified patent and that said Letters Patent is hereby corrected as shown below:

Claim 1, Line 33: delete "his" and insert --bis--.

Claim 3, Line 45: delete "a-aminoethyl" and insert --2-aminoethyl--.

Claim 7, Line 56: delete "4" and insert --3--.

Claim 8, Line 59: delete "1" and insert --4--.

Claim 9, Line 62: delete "3" and insert --1--.

Claim 11, Line 5: delete "3" and insert --1--.

Claim 15, Line 31: delete "sort" and insert --soft--.

Claim 17, Line 8: delete "his" and insert --bis--.

Signed and Sealed this

Twenty-fifth Day of February, 1997

Attest:

BRUCE LEHMAN

*Attesting Officer*  *Commissioner of Patents and Trademarks*